US007136663B2

(12) United States Patent
Metais et al.

(10) Patent No.: US 7,136,663 B2
(45) Date of Patent: Nov. 14, 2006

(54) METHOD FOR CONTROLLING A COMMUNICATIONS CHANNEL SHARED BY SEVERAL STATIONS

(75) Inventors: Jean-Pierre Metais, Plaisir (FR); David Le Gal, Les Lilas (FR)

(73) Assignee: EADS Secure Networks, Montigny le Bretonneux (FR)

( * ) Notice: Subject to any disclaimer, the term of this patent is extended or adjusted under 35 U.S.C. 154(b) by 212 days.

(21) Appl. No.: 10/149,535

(22) PCT Filed: Dec. 12, 2000

(86) PCT No.: PCT/FR00/03480

§ 371 (c)(1),
(2), (4) Date: Sep. 4, 2002

(87) PCT Pub. No.: WO01/45440

PCT Pub. Date: Jun. 21, 2001

(65) Prior Publication Data

US 2003/0050083 A1 Mar. 13, 2003

(30) Foreign Application Priority Data

Dec. 13, 1999 (FR) .................................. 99 15703

(51) Int. Cl.
*H04B 7/00* (2006.01)
(52) U.S. Cl. ...................... 455/509; 455/515; 455/464; 455/60
(58) Field of Classification Search ................ 455/509, 455/516, 518, 519, 520, 426, 528, 515, 450, 455/452; 370/337, 312
See application file for complete search history.

(56) References Cited

U.S. PATENT DOCUMENTS

| 4,887,266 | A | * | 12/1989 | Neve et al. .................. 370/349 |
| 5,125,101 | A | * | 6/1992 | Johnson et al. ................ 455/9 |
| 5,612,955 | A | * | 3/1997 | Fernandes et al. .......... 370/433 |
| 5,636,243 | A | * | 6/1997 | Tanaka ....................... 375/219 |
| 5,894,472 | A | * | 4/1999 | de Seze ...................... 370/337 |
| 6,449,491 | B1 | * | 9/2002 | Dailey ......................... 455/518 |
| 6,590,928 | B1 | * | 7/2003 | Haartsen ..................... 375/134 |
| 6,684,080 | B1 | * | 1/2004 | Barnes et al. ............... 455/515 |

FOREIGN PATENT DOCUMENTS

| EP | 0 737 018 | 10/1996 |
| EP | 0 778 680 | 6/1997 |
| GB | 2 285 723 | 7/1995 |

OTHER PUBLICATIONS

International Search Report, dated Aug. 8, 2000; Int'l Appl. No. FR 99/5703.

* cited by examiner

*Primary Examiner*—Matthew D. Anderson
*Assistant Examiner*—Tan Trinh
(74) *Attorney, Agent, or Firm*—McCracken & Frank LLP

(57) ABSTRACT

During a communication, a channel is shared by several transmitting/receiving stations comprising a single master station and one or more slave stations. A station becomes a master station by transmitting traffic information on the channel. After the master station has stopped transmitting traffic information without the communication being concluded, it continues to transmit signaling information authorizing each slave station in turn to transmit traffic information on the channel. This transmission of signaling information continues for as long as the communication lasts, until one of the slave stations becomes the master station in turn by beginning to transmit traffic information on the channel or until the same station begins to transmit traffic information again, hereby remaining the master station.

14 Claims, 2 Drawing Sheets

METHOD FOR CONTROLLING A COMMUNICATIONS CHANNEL SHARED BY SEVERAL STATIONS

FIELD OF THE INVENTION

The present invention relates to the field of telecommunications, and in particular to that of professional mobile radiocommunications.

BACKGROUND OF THE INVENTION

Most professional mobile radiocommunications systems use the principle of "trunking", that is to say the network possesses an infrastructure which manages the use of the radio resources, throughout the duration of the communications. The network allocates the resources to the communications and controls the access of the terminals to the air interface.

Systems without "trunking" also exist, in which mobile terminals can communicate in direct mode or in relayed mode, that is to say by way of repeaters. In general, the voice communications are of the walkie-talkie type, with channel access on an alternate turns basis. The terminal listens to the frequency of the channel so as to determine whether it has the right to transmit when the user actuates a PTT ("push-to-talk") button with which the terminal is provided. The right to transmit is granted if the channel is free or busy with a communication over which the terminal has priority.

In this latter type of system, the call with off-hook services (FOACSU: "full off-air call set-up") of telephone type are not supported. Specifically, in the absence of a base station or repeater managing the connection and access to the radio channel, a communication can be interrupted by an external user, during a silence on the channel due to the halting of voice transmission.

An aim of the present invention is to propose a way of supporting the services of call with off-hook type in radiocommunications systems without "trunking".

SUMMARY OF THE INVENTION

The invention thus proposes a method for controlling a channel shared by several transmitting/receiving stations, comprising at least one phase of use of the channel by a station participating in a communication, in the course of which said station transmits traffic information on the channel, followed immediately by a phase of retention of the channel by said station, in the course of which said station transmits signaling information authorizing each other station participating in the communication to transmit in turn traffic information on the channel. This phase of retention of the channel by said station continues, so long as the communication is in progress, until another phase of use of the channel by a station participating in the communication.

A transmitting/receiving station is master of the channel when it transmits traffic signals (typically speech). In the case where the station is a mobile terminal, when its owner stops talking, the station nevertheless continues to transmit the signaling information on the radio resource employed by the communication. This allows the slave stations participating in the communication to take their turn to speak, and prevents the other stations, not involved in the communication, from trespassing by believing the channel to be free.

The signaling information, transmitted at least between the speech alternations, can comprise data identifying a set of stations permitted to participate in the communication, and/or data indicating a level of priority of the communication, and/or a reference for identifying the communication. On receiving this information, a transmitting/receiving station different from the master station can determine whether it has the right to transmit on the radio resource, that is to say whether it is participating in the communication (of point-to-point or group call type) or whether it has a right of channel override. The station which starts transmitting then becomes the new master station, and the previous master station becomes a slave station (unless it is this station which has resumed speaking).

Another aspect of the invention pertains to a station for transmitting/receiving on a shared channel, implementing the method hereinabove and comprising:

- means of use of the channel in master mode in the course of a communication, which are designed to transmit traffic information on the channel;
- means of retention of the channel in master mode in the course of a communication, which are designed to alternately transmit signaling information on the channel and to listen to the channel, said signaling information authorizing each other station participating in the communication to transmit in turn traffic information on the channel;
- means of reception in slave mode for receiving traffic and signaling information transmitted in master mode by another station participating in the communication; and
- means of control for activating the means of use of the channel in master mode in response to a request for use when signaling information authorizing the transmission of traffic information has been received by the means of reception in slave mode, so as to activate the means of retention of the channel in master mode in response to a deactivation of the means of use of the channel in master mode, and to activate the means of reception in slave mode in response to the reception of signals originating from another station participating in the communication by the means of retention of the channel in master mode listening to the channel.

BRIEF DESCRIPTIONS OF THE DRAWINGS

DESCRIPTION OF THE PREFERRED EMBODIMENT

Figure 1:
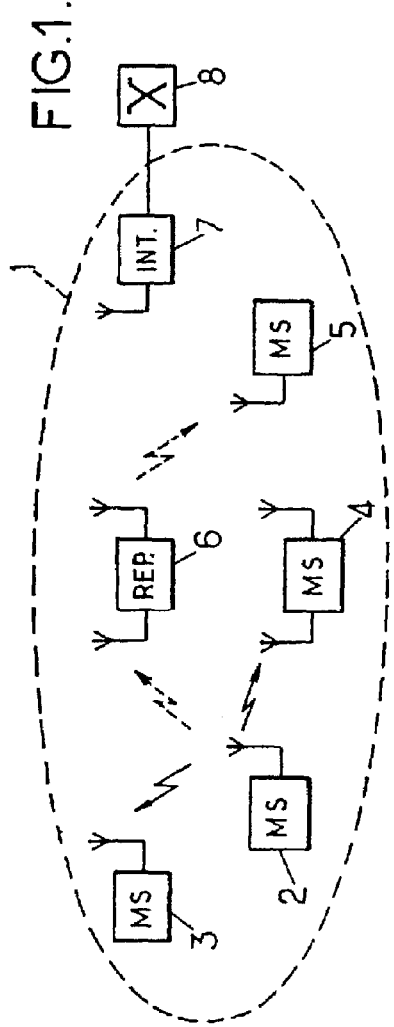
FIG. 1 is a diagram illustrating a radiocommunication system to which the invention may be applied.

FIG. 1 diagrammatically shows a professional radiocommunication system 1 supplying telephony services to owners of mobile terminals (MS) 2–5. The system comprises radio transmitting/receiving stations comprising the mobile terminals 2–5, possibly repeaters 6 serving to boost the radio coverage of the system, and possibly interfaces 7 serving as gateways with one or more switches 8 of external networks (for example switched network or cellular network) so as to allow telephone calls between the owners of the mobile terminals 2–5 and external subscribers.

The fixed stations 6, 7 of the system 1 do not necessarily offer a network service for supervising the radio communications in progress. The control of access to the channel is dealt with by the various stations involved in the communication, one of them being a master station and the other or others slave stations. In the course of a communication, the allocating of the role of master station is performed according to the speaking turns taken by the parties.

In the illustration of FIG. 1, the mobile terminal 2 is the master station at the instant considered, in a communication also involving the mobile terminals 3 and 4 in direct mode.

By way of example, each mobile terminal 2–5 comprises a PTT ("press-to-talk") button which the user actuates in order to take his turn to speak. In response to this actuation, the terminal assesses whether it can access the channel supporting the communication. If it cannot, the speaking turn is denied. In the case of a gateway 7, the role of the actuation of the PTT button is played by the detection of a speech signal to be relayed originating from the switch 8.

By way of example, in the particular case of a frequency division multiple access (FDMA) system, each physical channel serving to support a communication consists of a frequency available to the system. In the case where a repeater 6 is involved, the latter can apply a transposition of this frequency so as to avoid the problems of interference between the radio signals which it transmits and those which it receives.

Figure 2:
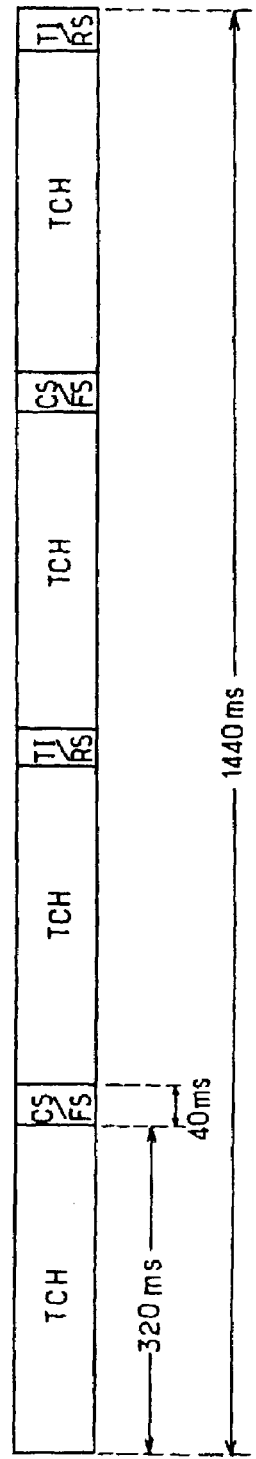
FIGS. 2 and 3 are charts showing exemplary frame structures useable in a method according to the invention.

FIG. 2 shows an exemplary frame structure adopted in a phase of use of the channel by a master station currently transmitting traffic information in the course of a voice communication in an FDMA radio system according to FIG. 1. In this example, superframes of 1440 ms follow one another on the relevant frequency. This superframe is divided into four parts of like duration, each comprising an interval of 320 ms for the transmission of traffic information (voice signals) over a traffic channel TCH, and an interval of 40 ms for the transmission of signaling information.

One interval of 40 ms out of two is devoted to a logical channel for signaling CS/FS from the master station to the slave stations participating in the communication. This logical channel carries a synchronization pattern, known a priori to the stations of the system, and serving to synchronize them with the frame structure generated by the master station. The CS ("channel status") information advises the stations other than the master station as to the channel busy state, and comprises in particular:

the identity or address in the system of the transmitting station (master);

the address of the destination station (case of a point-to-point communication), or in the case of a group call the addresses of the destination stations, which may be concatenated into a group address;

a reference number for the communication in progress;

an identification of the system 1;

the level of priority of the communication in progress;

the state of the channel.

The FS ("forward signaling") information supplies signaling provided for in the system from the master station to the other station or stations engaged in the communication in progress.

In the 40 ms interval devoted to the CS/FS logical channel, the transmission may be performed in the following order:

the FS information, intended for stations already synchronized;

the synchronization pattern allowing these stations to track the synchronization and allowing the other stations to acquire it;

the CS information which the synchronized stations can decode to determine whether a communication relevant to them is underway and to what extent they can transmit on the channel.

The other time intervals of 40 ms of the superframe according to FIG. 2 serve for the reception of information by the master station. This information pertains to two logical channels:

RS ("reverse signaling") supplying signaling provided for in the system to the master station from the other station or stations engaged in the communication in progress, and allowing for example the slave stations to respond to interrogations formulated by the master station in the FS signaling or to signal their entry or their withdrawal from a group communication;

TI ("terminal interrupt") allowing terminals of the system, which may be external to the communication in progress, to request access to the channel for emergency calls. The logical channel TI is also listened to by the slave stations which are not currently transmitting on the RS logical channel.

Figure 3:
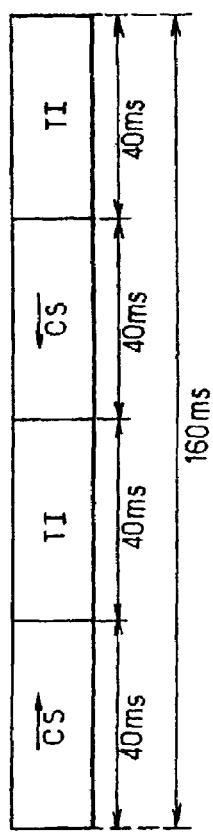

FIG. 3 shows an exemplary frame structure useable in a call setup phase in the radio system of FIG. 1. The same structure can be adopted when a voice communication is in progress in a phase of retention of the channel by the master station, that is to say while the master station has stopped transmitting traffic information and before another station starts transmitting (thus becoming the new master station using the channel). In this example, frames of 160 ms follow one another on the relevant frequency, and are each divided into four intervals of 40 ms. The first interval contains information of the CS type such as described previously, accompanied by the synchronization pattern. The third interval is also provided so as to be able to contain information of the CS type. The second and fourth intervals belong to the aforesaid TI logical channel.

In the setup phase, the station which has the call initiative (master) generates the frame structure according to FIG. 3 and sends, in the first interval of 40 ms, CS information identifying the called station or stations, the coding of the state of the channel corresponding to a call setup. Each called station (slave) detecting the synchronization pattern then has available the third interval of 40 ms of the frame to respond to the calling station. If a single exchange of CS type information is not sufficient to set up the communication in accordance with the call protocol employed, a dialog can take place between the relevant stations, the master station using the first intervals of the frames and the slave stations using the third intervals to transmit signaling information, the state of the channel indicated representing the state of advance of the call setup procedure (ringing, off-hook, etc.). The stations can also use FS/RS type signaling. Once the setup phase is complete (the called party has gone off-hook), any one of the stations participating in the communication takes its turn to speak and becomes master of the channel by generating the frame structure according to FIG. 2.

In the phase of retention of the channel by a master station having stopped transmitting on the TCH logical channel, this master station transmits the CS information in the first interval of 40 ms of the frame according to FIG. 3, with a coding of the state of the channel indicating to the slave stations involved in the communication that they are authorized to seize the channel. By detecting this CS information, the slave stations synchronize themselves with the frame structure of FIG. 3. If one of them seizes the channel (actuation of the PTT button), it transmits a first block of CS information in the third interval of 40 ms of the frame and it becomes master by adopting the frame structure according to FIG. 2. The master station retaining the channel listens during the third interval of 40 ms of the frame. When it detects therein the CS information transmitted by the other station currently seizing the channel, it abandons the master station status henceforth held by this other station. If the turn to speak is seized again, first, by the owner of the master station retaining the channel, this station remains master of the channel.

The first block of CS information transmitted by the station authorized to seize the channel could also be located in the second or fourth intervals of 40 ms since the master station is listening during these intervals.

The stations external to the communication detect the synchronization pattern accompanying the CS information in the first interval of 40 ms of the frame according to FIG. 3, thus noting that the channel is busy. They can optionally decode the CS information which follows in the first interval, thereby allowing them to verify whether they can enter into the communication (station targeted by a group call which was not previously participating in the communication; this is the "late entry" function also supported by the CS information in the phase of use of the channel by the master station) or whether they have a right of channel override in view of the priority level indicated. If not, they are prevented from accessing the channel, other than to transmit TI information in the case where they must put through an emergency call.

Figure 4:
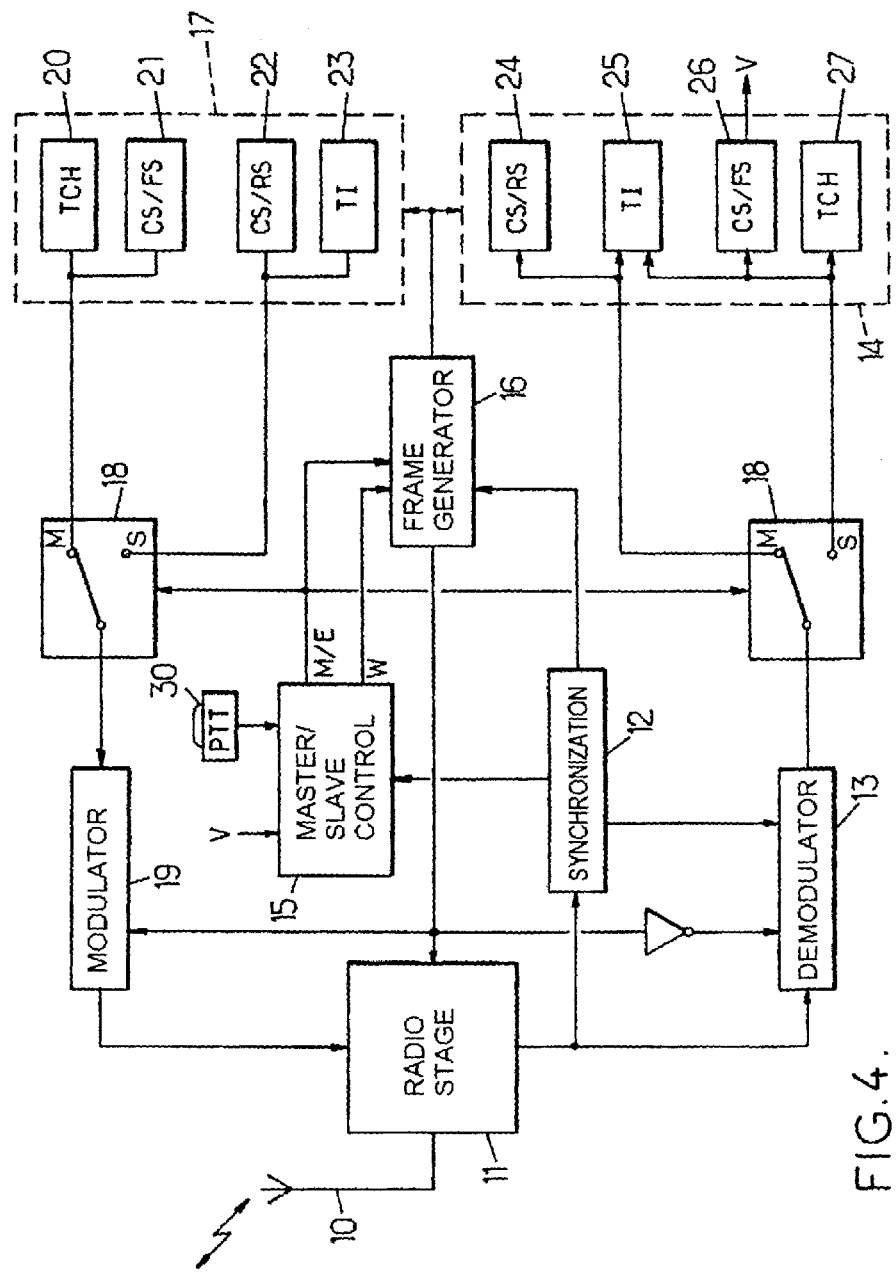
FIG. 4 is a schematic diagram of a transmitting/receiving station according to the invention.

A basic diagram of a transmitting/receiving station is represented in FIG. 4. The antenna 10 of the station is linked to its radio stage 11 corresponding to the analog part of the radio station.

For the reception part, the baseband signal delivered by the radio stage 11 is supplied to a synchronization unit 12 and to a demodulator 13. The unit 12 searches for the synchronization patterns of the signal received, in particular the synchronization patterns accompanying the CS information. The demodulator 13, synchronized by the unit 12, estimates the symbols sent on the basis of the baseband signal, and supplies these estimated symbols to the processing circuits 14 of the station.

A unit 15 controls the status, master or slave, of the transmitting/receiving station, by delivering a M/S bit to a frame generator 16 which delivers sequencing signals complying with the frame structure according to FIG. 2 or 3. The unit 15 also controls the generator 16 with a bit W to indicate thereto that the frames must be according to FIG. 2 (W=1, phase of use of the channel) or according to FIG. 3 (W=0, call setup or channel retention phase). When the station is a master terminal (for example M/S=1), the frame structure is generated with reference to a local clock. When the station is slave (M/S=0), the frame structure is generated in accordance with the synchronization information acquired by the unit 12 from the signal received.

The frame generator 16 controls the radio stage 11, the modulator 19 and the demodulator 13 so as to place the station in terms of transmission or reception in the appropriate time intervals according to the frame structure in force.

The frame generator 16 also undertakes the sequencing of the circuits 14 for processing the signal received, and that of the circuits 17 for processing the signals to be transmitted. FIG. 4 illustrates in each block 14, 17 the circuits 20–23, 24–27 for processing the logical channels mentioned with reference to FIGS. 2 and 3.

When the station is master, the bit M/S=1 delivered by the unit 15 operates the switches 18 into the position M represented in FIG. 4. In the channel use phase, the signal transmitted, supplied to the radio stage 11 by the modulator 19, originates from the circuits 20, 21 for processing the logical traffic channel TCH and the logical signaling channel CS/FS, which are clocked by the frame generator 16. In the remaining intervals of 40 ms of the frame according to FIG. 2, the circuits 24, 25 of the master station listen to the RS and TI logical channels so as to receive the signals which may be transmitted by the other stations. In the call setup or channel retention phase, the signal transmitted in the first intervals of 40 ms of the frames originates solely from the circuit 21 for processing the CS/FS logical channel, clocked by the frame generator 16. In the other three intervals of 40 ms of the frame according to FIG. 3, the circuits 24, 25 of the master station listen to the CS/RS and TI logical channels so as to receive the signals which may be transmitted by the other stations.

When the station is slave, the switches 18 are operated into the position S of FIG. 4. In the phase of use of the channel by another station, the frame generator 16 activates at the appropriate instants the circuit 22 for processing the RS logical channel for the transmission part and the circuits 25–27 for processing the TI, CS/FS and TCH logical channels for the reception part, in accordance with the frame structure of FIG. 2 generated by the master station. In the phase of call setup or of retention of the channel by another station, the frame generator 16 activates at the appropriate instants the circuit 22 for processing the CS/RS logical channel for the transmission part and the circuits 25, 26 for processing the TI and CS/FS logical channels for the reception part, in accordance with the frame structure of FIG. 3 generated by the master station.

The frame generator 16 also operates the circuit 23 for transmission processing on the TI logical channel in the case of the terminals external to the communication in progress (switches 18 in the position S) so as to allow them to possibly place an emergency call. Otherwise, the circuit 25 for reception processing on the TI logical channel is activated in the corresponding intervals so as to allow the station to pick up a possible emergency call.

Terminals according to FIG. 4 can communicate with one another in walkie-talkie mode. When the user of a terminal according to FIG. 4 wishes to access the channel so as to transmit voice signals, he actuates the PTT button 30 with which the terminal is provided. His terminal, which is not master of the channel at this moment, then examines whether the carrier is busy, by listening to the channel for long enough to pick up at least one time interval of the CS/FS logical channel. If the busy state is not detected, the terminal determines that no other station is master of the channel, and it becomes master itself so as to transmit the signals of the user. It can also become master if the channel is busy with a communication over which the user has a right of override (which can be determined on the basis of the communication's priority level indicated in the CS information). The channel is released when the user has finished speaking. The system thus provides telephony services similar to those offered in traditional systems without "trunking".

Advantageously, the system also allows communications of call with off-hook type, between two mobile terminals or further in direct or repeated mode. One or more of the terminals involved in such a communication can also be external terminals attached by way of a gateway 7. The call is firstly set up in the manner indicated previously. On termination of this setup phase and up to the end of the communication (the penultimate station hangs up), there is always one of the radio stations involved which is master of the channel.

While a station is transmitting a voice signal on a carrier, it is master of the corresponding frequency channel. When it stops transmitting on the TCH logical channel without the communication being completed, it remains master and its generator 16 generates the frame structure according to FIG. 3. The circuits 21 are operated in such a way that the master station continues to transmit on the logical signaling channel CS, by supplying at least the CS information and the synchronization pattern as explained previously. This prevents any trespass on the channel of a terminal not involved in the communication in progress and having no right of override. Moreover, the master station retaining the channel places itself in reception mode in the time intervals of 40 ms in which it does not transmit the CS information.

The state of the channel coded in the CS information transmitted in the channel retention phase indicates to the slave stations involved in the communication that they can seize the channel. If the user of such a station actuates his PTT button 30, this station becomes master of the channel and begins to transmit signals on the CS/FS and TCH logical channels. To guarantee that the synchronization pattern sent on the CS/FS logical channel will be detected by the station previously master, the new master station shifts its transmission in such a way that the first synchronization pattern falls in the third time interval of 40 ms of the frame previously transmitted in the channel retention phase (if need be in the second or the fourth). In response to the detection of signals transmitted on the channel by another station, in particular the synchronization pattern, the station which was master becomes slave and synchronizes itself with the frame structure of the new master station.

In the exemplary embodiment illustrated by FIG. 4, the circuits 26 for reception processing on the CS/FS logical channel deliver a bit V whose activation indicates that the slave station is authorized to seize the channel. This bit is determined by analyzing the CS information transmitted by the master station. It is activated if the state of the channel indicates that the master station has stopped transmitting on the TCH logical channel (channel retention phase) and if the slave station identifies itself as participating in the communication on the basis of the addresses included in the CS information. It may also be activated if the terminal notes that it can exercise a right of channel override in view of the priority level indicated. This bit V is supplied to the control unit 15 so as to validate the master status when the user actuates the PTT button 30. Moreover, the unit 15 addresses the bit W to the frame generator 16, this bit indicating, when a call is in progress, whether or not one of the communicating stations is in the channel use phase (W=1).

When the station is master (M/S=1) without occupying the TCH logical channel (W=0), the radio stage 11, the modulator 19 and the demodulator 13 are operated in a modified manner by the frame generator 16 so as to place the station in reception mode in the second, third and fourth time intervals of 40 ms of each frame according to FIG. 3. The detection of the synchronization pattern by the unit 12 when M/S=1 and W=0 then causes the station to toggle into the slave state (M/S=0).

In a variant embodiment, the change of master station of the channel currently communicating could result from a dialog (handshake) between the station previously master and that which requires to become so.

Call with off-hook functions in a similar manner when a repeater 16 is interposed between the master terminal 2 and the slave terminal 5, as illustrated by dashes in FIG. 1. The repeater 6 echoes the frame structure generated by the master terminal 2, with carrier frequency transposition, to the terminal 5, thereby allowing the latter to synchronize itself also. Thus, as far as the frequency channel used between the terminal 2 and the repeater 6 is concerned, the terminal 2 is the master station transmitting the voice signal and generating the frame structure. On the other frequency channel used between the terminal 5 and the repeater 6, it is the repeater 6 which, relaying the terminal 2, plays the role of master station transmitting voice signals by using the frame structure with which it has previously synchronized itself. The repeater 6 can be regarded as comprising two transmitting/receiving stations back-to-back, one working on the primary frequency on which it receives the signals from the master terminal, and the other on the transposed frequency on which it retransmits them, the difference with the case of the direct mode described hereinabove being that the terminals must switch their frequency for the RS logical channel.

The invention claimed is:

1. A method for controlling a channel shared by several transmitting/receiving stations, comprising at least one phase of use of the channel by a station participating in a communication, in the course of which said station transmits traffic information on the channel, followed immediately by a phase of retention of the channel by said station, in the course of which said station transmits signaling information indicating to each other station participating in the communication that it is authorized to transmit in turn traffic information on the channel, the phase of retention of the channel by said station continuing, so long as the communication is in progress, until another phase of use of the channel by a station participating in the communication.

2. The method as claimed in claim 1, wherein, in the phase of use of the channel, said station furthermore transmits signaling information requesting each other station participating in the communication not to transmit traffic information.

3. The method as claimed in claim 2, wherein said station operates in the phase of use of the channel according to a first frame structure comprising at least time intervals for the transmission on the channel of the traffic information and time intervals for the transmission on the channel of the signaling information, and in which said station operates in the phase of retention of the channel according to a second frame structure comprising at least time intervals for the transmission on the channel of the signaling information and time intervals for the reception of signals originating from another station participating in the communication and beginning to transmit traffic information on the channel, the reception of said signals ending the phase of retention of the channel by said station, replaced by a phase of use of the channel by said other station.

4. The method as claimed in claim 3, wherein the first and second frame structures furthermore comprise time intervals for the reception of signals originating from stations not participating in the communication.

5. The method as claimed in claim 1, wherein said signaling information comprises data for identifying the stations participating in the communication.

6. The method as claimed in claim 1, wherein said signaling information comprises data indicating a level of priority of the communication.

7. The method as claimed in claim 1, wherein said signaling information comprises a reference for identifying the communication.

8. A station for transmitting/receiving on a shared channel, comprising:
- means of use of the channel in master mode in the course of a communication, which are designed to transmit traffic information on the channel;
- means of retention of the channel in master mode in the course of a communication, which are designed to alternately transmit signaling information on the channel and to listen to the channel, said signaling information authorizing each other station participating in the communication to transmit in turn traffic information on the channel;
- means of reception in slave mode for receiving traffic and signaling information transmitted in master mode by another station participating in the communication; and
- means of control for activating the means of use of the channel in master mode in response to a request for use when signaling information authorizing the transmission of traffic information has been received by the means of reception in slave mode, so as to activate the means of retention of the channel in master mode in response to a deactivation of the means of use of the channel in master mode, and to activate the means of reception in slave mode in response to the reception of signals originating from another station participating in the communication by the means of retention of the channel in master mode listening to the channel.

9. The transmitting/receiving station as claimed in claim 8, wherein the means of use of the channel in master mode are designed to transmit, furthermore, signaling information requesting each other station participating in the communication not to transmit traffic information.

10. The transmitting/receiving station as claimed in claim 9, wherein the means of use of the channel in master mode operate according to a first frame structure comprising at least time intervals for the transmission on the channel of the traffic information and time intervals for the transmission on the channel of the signaling information, and in which the means of retention of the channel in master mode operate according to a second frame structure comprising at least time intervals for the transmission on the channel of the signaling information and time intervals for channel listening.

11. The transmitting/receiving station as claimed in claim 10, wherein the first and second frame structures furthermore comprise time intervals for the reception of signals originating from stations not participating in the communication.

12. The transmitting/receiving station as claimed in claim 8, wherein said signaling information comprises data for identifying the stations participating in the communication.

13. The transmitting/receiving station as claimed in claim 8, wherein said signaling information comprises data indicating a level of priority of the communication.

14. The transmitting/receiving station as claimed in claim 8, wherein said signaling information comprises a reference for identifying the communication.

* * * * *